(12) United States Patent
Yamaguchi et al.

(10) Patent No.: US 11,451,024 B2
(45) Date of Patent: Sep. 20, 2022

(54) WIRING MEMBER INTEGRATED BUILT-IN COMPONENT

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Mie (JP); Hiroki Hirai, Mie (JP); Makoto Higashikozono, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 145 days.

(21) Appl. No.: 17/041,178

(22) PCT Filed: Nov. 26, 2018

(86) PCT No.: PCT/JP2018/043447
§ 371 (c)(1),
(2) Date: Sep. 24, 2020

(87) PCT Pub. No.: WO2019/187334
PCT Pub. Date: Oct. 3, 2019

(65) Prior Publication Data
US 2021/0098976 A1    Apr. 1, 2021

(30) Foreign Application Priority Data
Mar. 30, 2018 (JP) .............................. JP2018-066539

(51) Int. Cl.
*H02G 3/04* (2006.01)
*B60J 5/04* (2006.01)
(Continued)

(52) U.S. Cl.
CPC .......... *H02G 3/0437* (2013.01); *B60J 5/0413* (2013.01); *B60R 16/0215* (2013.01); *H02G 3/0418* (2013.01); *H02G 3/30* (2013.01)

(58) Field of Classification Search
CPC ............ B60R 16/0207; B60R 16/0215; B60R 13/0243; B60R 2021/23519; H02G 11/00; H02G 3/30
See application file for complete search history.

(56) References Cited

U.S. PATENT DOCUMENTS 4,818,236 A * 4/1989 Nakayama .......... B60R 16/0207
439/115
4,824,164 A * 4/1989 Nakayama ............... H02G 3/00
296/146.7

(Continued)

FOREIGN PATENT DOCUMENTS

| JP | 8-2348 | 1/1996 |
| JP | 9-23540 | 1/1997 |

(Continued)

OTHER PUBLICATIONS

International Search Report issued in International Patent Application No. PCT/JP2018/043447, dated Jan. 8, 2019, along with an English translation thereof.

(Continued)

*Primary Examiner* — Krystal Robinson
(74) *Attorney, Agent, or Firm* — Greenblum & Bernstein, P.L.C.

(57) ABSTRACT

A wiring member integrated door resin component includes a built-in component (for example, a door resin component)

(Continued)

and a wiring member. The built-in component is a component having a wiring member housing groove in one main surface and incorporated into a box-like member to partition an inner side and outer side of the box-like member. The wiring member is held by the built-in component in a state where at least a part thereof in an extension direction is housed in the wiring member housing groove.

20 Claims, 10 Drawing Sheets

(51) Int. Cl.
*B60R 16/02* (2006.01)
*H02G 3/30* (2006.01)

(56) References Cited

U.S. PATENT DOCUMENTS

| | | | | |
|---|---|---|---|---|
| 4,869,670 | A * | 9/1989 | Ueda | B60R 16/0207 296/146.7 |
| 6,312,046 | B1 * | 11/2001 | Sora | B60R 16/0222 174/152 G |
| 6,504,262 | B1 * | 1/2003 | Aoki | H02G 3/286 307/9.1 |
| 9,914,409 | B2 * | 3/2018 | Osada | B60R 13/08 |
| 2010/0264687 | A1 * | 10/2010 | Toyozumi | B60R 16/0215 296/146.1 |
| 2013/0009021 | A1 * | 1/2013 | Germ | H02G 3/263 248/224.8 |

FOREIGN PATENT DOCUMENTS

| | | |
|---|---|---|
| JP | 9-76837 | 3/1997 |
| JP | 2014-69605 | 4/2014 |
| JP | 2015-50855 | 3/2015 |
| JP | 2016-63691 | 4/2016 |

OTHER PUBLICATIONS

International Preliminary Report on Patentability issued in International Patent Application No. PCT/JP2018/043447, dated Jul. 10, 2019, along with an English translation thereof.

Written Opinion issued in International Patent Application No. PCT/JP2018/043447, dated Jan. 8, 2019.

* cited by examiner

F I G. 1
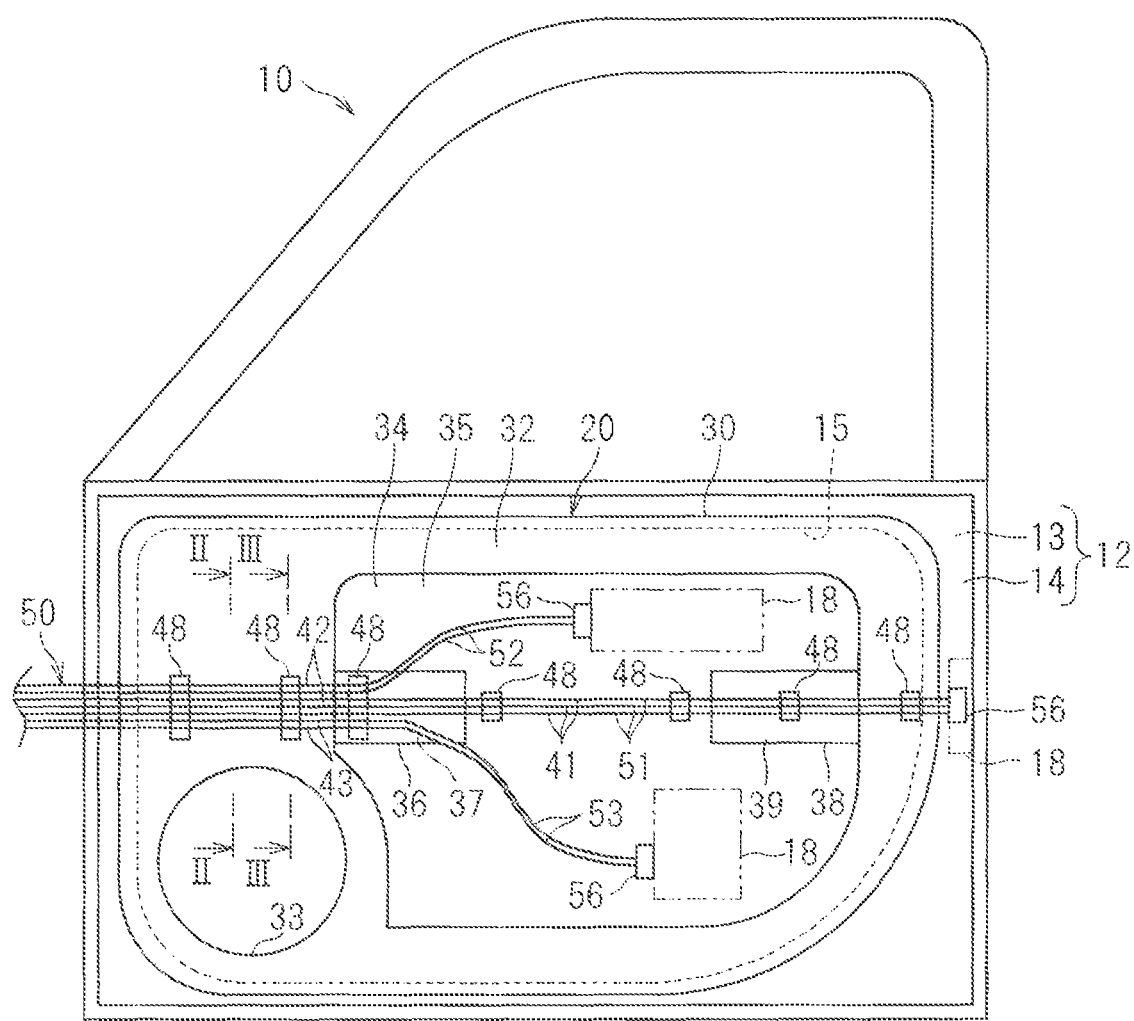

WIRING MEMBER INTEGRATED BUILT-IN COMPONENT

TECHNICAL FIELD

The present invention relates to a technique for fixing a wiring member such as a wire harness to a box-like member having a storage space such as a door.

BACKGROUND ART

Patent Document 1 discloses a technique of holding a door harness with a wire harness holding part, and inserting a clip provided in the wire harness holding part into a locking hole provided in an inner plate of a door, thereby fixing the wire harness holding part.

PRIOR ART DOCUMENTS

Patent Documents

Patent Document 1: Japanese Patent Application Laid-Open No. 9-76837

SUMMARY

Problem to be Solved by the Invention

According to the technique disclosed in Patent Document 1, the locking hole for inserting the clip is formed in the inner plate of the door.

There is a problem that the door has less water sealing properties and sound insulation properties when the locking hole for fixing the wire harness is formed in the inner plate of the door.

Thus, an object of the present invention is to provide a technique capable of reducing the number of holes for fixing a wiring member as much as possible in a configuration of fixing the wiring member to a box-like member which is a constituent part of a door, for example.

Means to Solve the Problem

In order to solve the above problems, a wiring member integrated built-in component according to a first aspect includes: a built-in component having at least one wiring member housing groove in one main surface and incorporated into a box-like member to partition an inner side and outer side of the box-like member, and a wiring member held to the built-in component while at least a part of the wiring member in an extension direction is housed in the wiring member housing groove.

Also, a part of the built-in component on a side opposite to the wiring member housing groove includes a part formed to have a flat surface, and the built-in component is a door component incorporated into a metal inner panel located on an inner side of a door to cover an opening of the metal inner panel.

A third aspect is the wiring member integrated built-in component according to the first aspect, wherein the built-in component is a resin component.

A fourth aspect is a wiring member integrated built-in component including: a built-in component having at least one wiring member housing groove in one main surface and incorporated into a box-like member to partition an inner side and outer side of the box-like member; and a wiring member held to the built-in component while at least a part of the wiring member in an extension direction is housed in the wiring member housing groove, wherein the built-in component is a resin component, and a hot-melt crush part preventing the electrical wiring in the wiring member housing groove from coming out of the wiring member housing groove is formed in an opening part of the wiring member housing groove located on a side opposite to a bottom of the wiring member housing groove.

A fifth aspect is the wiring member integrated built-in component according to any one of the first, third and fourth aspects, wherein the wiring member housing groove is formed in a part of the built-in component facing an inner side or outer side of the box-like member.

A sixth aspect is the wiring member integrated built-in component according to any one of the first, third to fifth aspects further includes a soundproof member overlapping with the built-in component on a side where the wiring member housing groove is formed.

A seventh aspect is a wiring member integrated built-in component, including: a built-in component having at least one wiring member housing groove in one main surface and incorporated into a box-like member to partition an inner side and outer side of the box-like member; and a wiring member held to the built-in component while at least a part of the wiring member in an extension direction is housed in the wiring member housing groove, wherein a retainer part preventing the electrical wiring in the wiring member housing groove from coming out of the wiring member housing groove is formed on an opening part of the wiring member housing groove on a side opposite to a bottom of the wiring member housing groove, and a through hole is formed in the retainer part.

An eighth aspect is a wiring member integrated built-in component including: a built-in component having at least one wiring member housing groove in one main surface and incorporated into a box-like member to partition an inner side and outer side of the box-like member; and a wiring member held to the built-in component while at least a part of the wiring member in an extension direction is housed in the wiring member housing groove, wherein the wiring member integrated built-in component further includes a filling fixing part filling the wiring member housing groove to fix the wiring member in the wiring member housing groove.

A ninth aspect is the wiring member integrated built-in component according to any one of the first, third to seventh aspects, wherein the wiring member is held in the wiring member housing groove to be movable along an extension direction of the wiring member housing groove.

A tenth aspect is the wiring member integrated built-in component according to any one of the first, third to ninth aspects, wherein the wiring member includes a plurality of electrical wirings, the plurality of wiring member housing grooves are formed in a parallel state in the built-in component, and the plurality of electrical wirings are divided and held in the plurality of wiring member housing grooves.

An eleventh aspect is the wiring member integrated built-in component according to the tenth aspect, wherein the plurality of wiring member housing grooves are formed in a parallel state in number corresponding to a total number of the plurality of electrical wirings, and the plurality of electrical wirings are individually held in the plurality of wiring member housing grooves.

A twelfth aspect is the wiring member integrated built-in component according to any one of the first, third to eleventh aspects further includes a cover member covering the wiring member from a side opposite to the built-in component.

Effects of the Invention

According to the first aspect, the wiring member is held by the built-in component in a state of being housed in the wiring member housing groove. Accordingly, a hole for inserting a clip for fixing the wiring member needs not be formed in the part where the wiring member is fixed by the wiring member housing groove. Accordingly, the number of holes for fixing the wiring member can be reduced as much as possible in the configuration of fixing the wiring member to the box-like member.

According to the first aspect, the wiring member housing groove is formed in a built-in component which is a door component incorporated to cover an opening of the metal inner panel, and the wiring member is housed and held in the wiring member housing groove, thus a thickness of the door can be reduced, a thickness of the box-like member can be reduced, and furthermore, a space of vehicle interior can be increased.

According to the third aspect, weight saving can be achieved.

According to the fourth aspect, the hot-melt crush part preventing the electrical wiring in the wiring member housing groove from coming out of the wiring member housing groove is formed in the opening part of the wiring member housing groove located on the side opposite to the bottom thereof, thus the wiring member can be held in the wiring member housing groove without welding the built-in component and the wiring member, for example.

According to the fifth aspect, the wiring member can be held in the part of the built-in component facing the inner side or outer side of the box-like member.

According to the sixth aspect, the wiring member can be retained in the wiring member housing groove by the soundproof member.

According to the seventh aspect, the electrical wiring can be detached from the wiring member housing groove by inserting a tool such as a screwdriver, for example, into the through hole and bringing up the retainer part to an upper side.

According to the eighth aspect, the wiring member can be fixed more reliably in the wiring member housing groove.

According to the ninth aspect, even when a difference in shrinkage and expansion occurs between the wiring member and the built-in component, the difference can be absorbed.

According to the tenth aspect, the plurality of electrical wirings am divided and held in the plurality of wiring member housing grooves formed in the parallel state, thus the plurality of electrical wirings can be held as flatly as possible.

According to the eleventh aspect, the plurality of electrical wirings are individually held in the plurality of wiring member housing grooves formed in the parallel state, thus the plurality of electrical wirings can be held more flatly.

According to the twelfth aspect, the wiring member hardly comes out of the built-in component.

BRIEF DESCRIPTION OF DRAWINGS

FIG. 1 A schematic side view illustrating a door into which a wiring member integrated door resin component is incorporated according to an embodiment.

DESCRIPTION OF EMBODIMENT(S)

Figure 2:
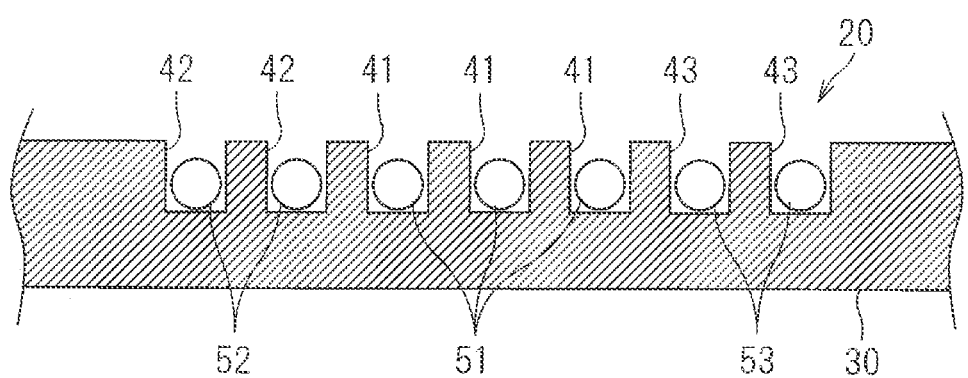
FIG. 2 A schematic cross-sectional view along a II-II line in FIG. 1.
Figure 3:
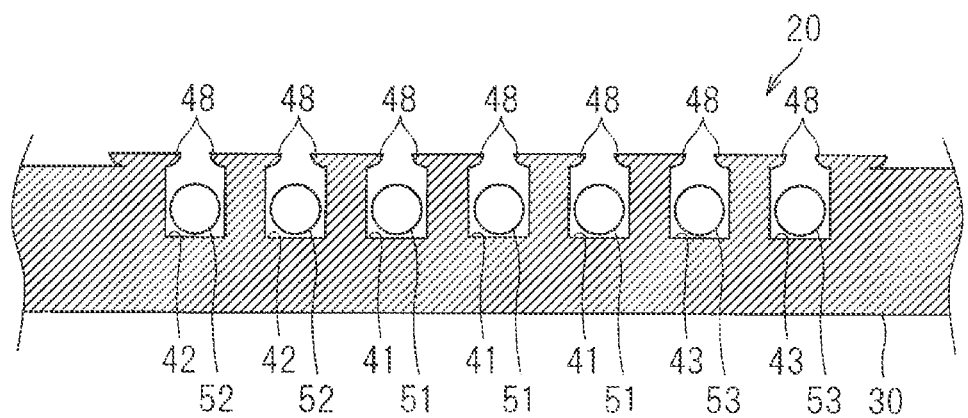
FIG. 3 A schematic cross-sectional view along a III-III line in FIG. 1.
Figure 4:
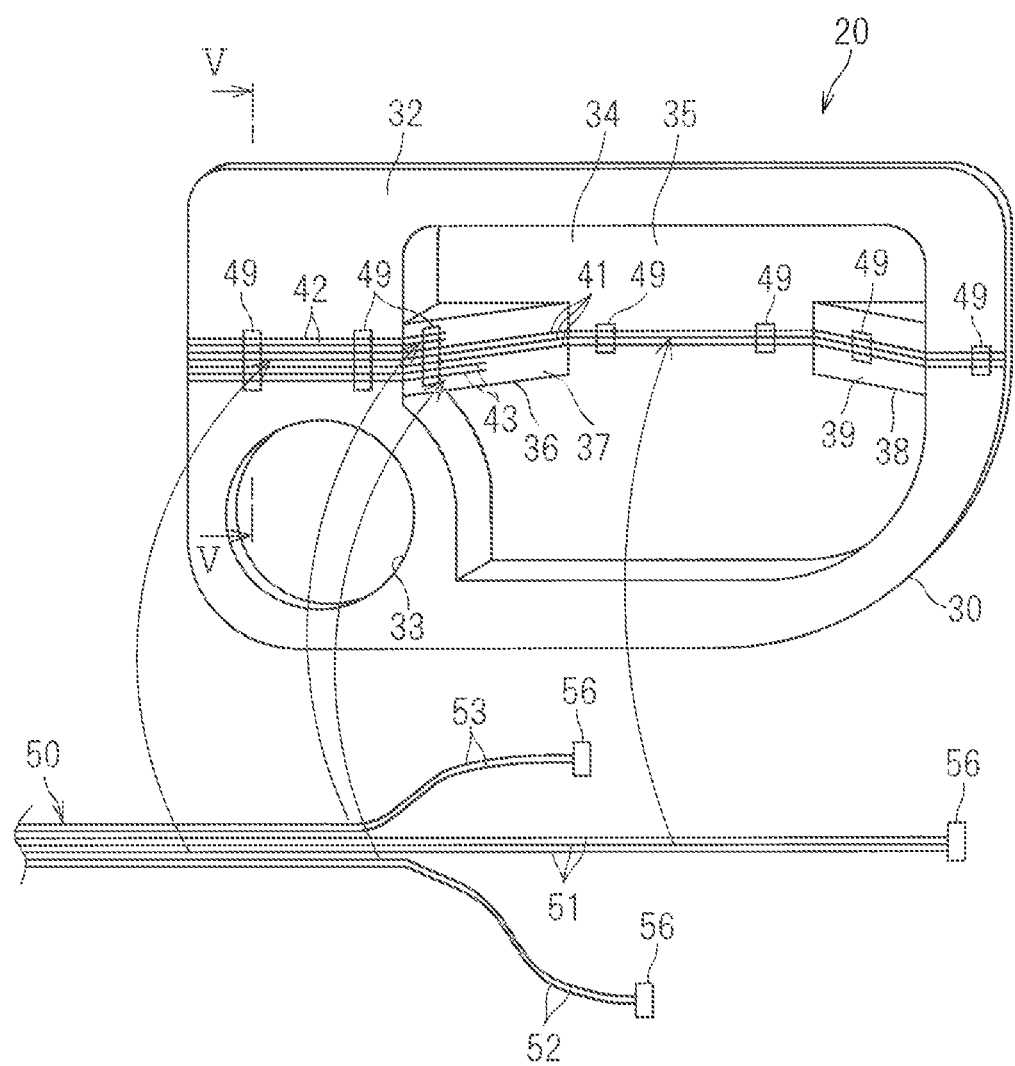
FIG. 4 A schematic exploded perspective view of the wiring member integrated door resin component.
Figure 5:
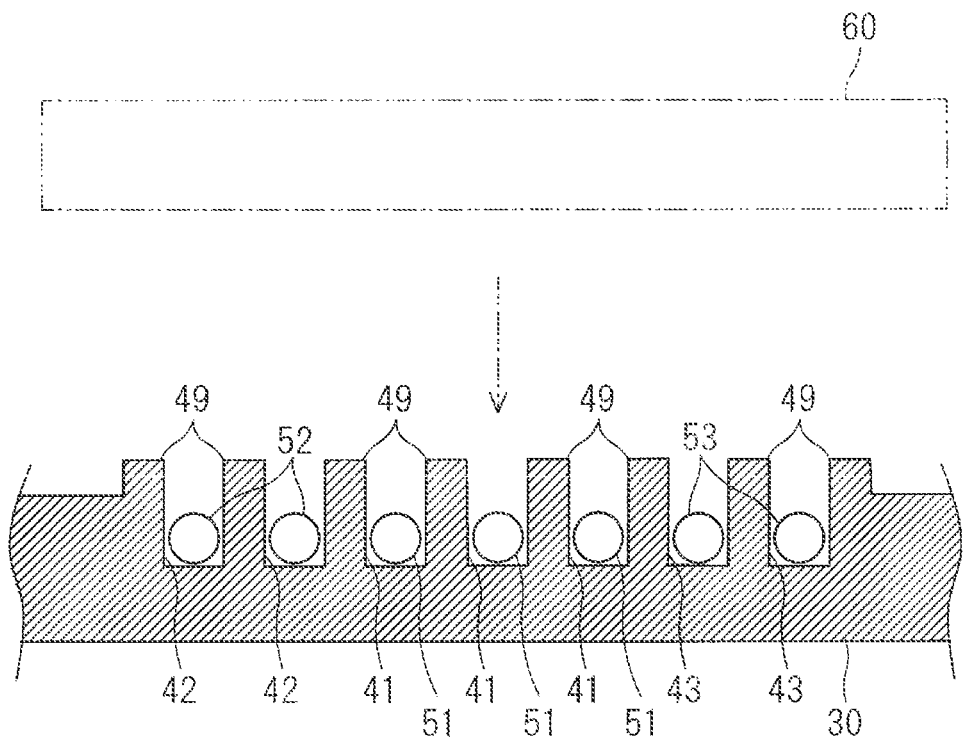
FIG. 5 A schematic cross-sectional view along a V-V line in FIG. 4.

A wiring member integrated built-in component according to an embodiment is described hereinafter. Described herein are an example that a built-in component is a resin component incorporated into a door and an example of wiring member integrated door resin component as a whole. FIG. 1 is a schematic side view illustrating a door 10 into which a wiring member integrated door resin component 20 is incorporated, FIG. 2 is a schematic cross-sectional view along a II-II line in FIG. 1, FIG. 3 is a schematic cross-sectional view along a III-III line in FIG. 1, FIG. 4 is a schematic exploded perspective view of the wiring member integrated door resin component 20, and FIG. 5 is a schematic cross-sectional view along a V-V line in FIG. 4.

The door 10 is formed into a flat shape as a whole, and is a part openable and closable to partition an inner side and outer side of a vehicle. The door 10 is assumed to be a driver side door, a passenger's side door, and a rear seat door, for example.

The door 10 includes a metal panel 12 and the wiring member integrated door resin component 20.

The metal panel 12 includes a metal outer panel 13 and a metal inner panel 14. The metal outer panel 13 is provided in a part of the door 10 facing the outer side of the vehicle to constitute an appearance of the vehicle together with a metal body. The metal inner panel 14 is provided on a side of a vehicle interior of the metal outer panel 13. An assembled body of the metal inner panel 14 and the metal outer panel 13 is an example of a box-like member. An opening 15 is provided in the metal inner panel 14. The wiring member integrated door resin component 20 is attached to the opening 15 to close the opening 15. A door resin component 30 is an example of a built-in component incorporated into the box-like member to partition an inner side and outer side of the metal inner panel 14 and the metal outer panel 13 constituting the box-like member.

The wiring member integrated door resin component 20 includes the door resin component 30 and a wiring member 50.

The door resin component 30 is a flat resin component having an area substantially equal to or larger than the opening 15. The door resin component 30 is attached to the opening 15 of the metal inner panel 14 to cover the opening 15. Accordingly, the door resin component 30 can partition the inner side and outer side of the vehicle. The door resin component 30 is attached to the opening 15 of the metal inner panel 14, and the attaching state is retained by a screwing structure or locking structure, for example. For example, when a part of a peripheral part of the door resin component 30 overlapping with the metal inner panel 14 is screwed to the metal inner panel 14 using a screw, for example, a gap therebetween can be practicably covered.

The door resin component 30 is attached to the metal inner panel 14, and a space is formed between the metal outer panel 13, the metal inner panel 14, and the door resin component 30. A window of the door 10 can be housed in this space. A window exposed to a rainwater environment is housed in the space, and a slit-like opening through which the window goes in and out is formed on an upper side of the space. Thus, the space is a space which water may enter. The space is a space which may be connected to an outer space, thus is also a space which a wind noise, for example, may enter from outside.

Thus, the door resin component 30 is provided as a member for completely partitioning a vehicle interior space and an outer space with the metal inner panel 14.

More specifically, the door resin component 30 is a resin molding component, and includes a main plate 32 and a storage space forming part 34.

The main plate 32 is a plate-like part with a sufficient size for covering the opening 15. The storage space forming part 34 is opened on a side of one main surface (a side of the vehicle interior) of the main plate 32, and is formed into a container shape protruding to a side of the other main surface (outside) of the main plate 32. The storage space forming part 34 is formed into a container shape smaller than the opening 15.

The door resin component 30 is fitted into the opening 15 of the metal inner panel 14, and the storage space forming part 34 is provided on an inner side of the opening 15. The main plate 32 covers a part between an opening edge portion of the storage space forming part 34 and a peripheral edge portion of the opening 15.

An electrical component 18 incorporated into the door 10 can be incorporated into the storage space forming part 34 of the door resin component 30, for example. The electrical component 18 is assumed to be a motor opening and closing the window, an actuator for locking and unlocking the door 10, and various switches, for example.

Wiring support protrusion parts 36 and 38 are provided to protrude from a part of an outer periphery of the storage space forming part 34 of the door resin component 30 toward an inner side of the storage space forming part 34.

One wiring support protrusion part 36 is provided to protrude from a front part which is a part of the outer periphery of the storage space forming part 34 toward the inner side of the storage space forming part 34 to extend along a front-back direction. The front or the back indicates a front or a back based on a vehicle. The wiring support protrusion part 36 has an inclined surface 37 whose height dimension gradually reduces from one main surface of the main plate 32 toward an inner surface 35 of a bottom of the storage space forming part 34.

The other wiring support protrusion part 38 is provided to protrude from a back part (a back side part of the vehicle) which is a part of the outer periphery of the storage space forming part 34 toward the inner side of the storage space forming part 34. When the door resin component 30 is viewed from the side of the vehicle interior, one wiring support protrusion part 36 and the other the wiring support protrusion part 38 are formed along the front-back direction of the vehicle. The wiring support protrusion part 38 has an inclined surface 39 whose height dimension gradually reduces from one main surface of the main plate 32 toward the inner surface 35 of the bottom of the storage space forming part 34.

End portions of the inclined surfaces 37 and 39 described above on a side of the bottom of the storage space forming part 34 are connected to the inner surface 35 of the bottom of the storage space forming part 34.

A speaker assembling hole 33 for assembling a speaker is formed in the main plate 32. It is not necessary to form the speaker assembling hole 33 in the door resin component 30. For example, it is also applicable that a speaker assembling hole is formed in a metal inner panel and the door resin component 30 is incorporated into a region except for a part where a speaker is incorporated into the metal inner panel.

Wiring member housing grooves 41, 42, and 43 are formed in one main surface of the door resin component 30. The wiring member 50 is held by the door resin component 30 in a state where at least a part thereof in an extension direction is housed in the wiring member housing grooves 41, 42, and 43.

More specifically, the wiring member housing grooves 41, 42, and 43 are formed along a wiring path of the wiring member 50 on the door resin component 30. Herein, the wiring member housing grooves 41, 42, and 43 include a first wiring member housing groove 41, a second wiring member housing groove 42, and a third wiring member housing groove 43.

Herein, a plurality of (three herein) first wiring member housing grooves 41 are formed. The first wiring member housing groove 41 is formed from a front part toward a back part of the door resin component 30 along the front-back direction of the vehicle. More specifically, the first wiring member housing groove 41 is formed to extend from a middle portion of a front edge portion of the main plate 32 in an up-down direction to a middle portion of a back edge portion of the main plate 32 in an up-down direction via one main surface on a front side of the main plate 32, the inclined surface 37, the inner surface 35 of the bottom of the storage space forming part 34, the inclined surface 39, and the other main surface on the back side of the main plate 32. When the door resin component 30 is viewed from the side of the vehicle interior, the first wiring member housing groove 41 is linearly formed to extend along the front-back direction of the vehicle.

The plurality of first wiring member housing grooves 41 are formed to extend in a parallel state at intervals. Each first wiring member housing groove 41 is formed into a groove-like shape capable of housing a first electrical wiring 51 one by one. A width of the first wiring member housing groove 41 is preferably equal to or larger than an outer diameter of the first electrical wiring 51. A depth of the first wiring member housing groove 41 is preferably equal to or larger than the outer diameter of the first electrical wiring 51.

The wiring member 50 of the door 10 is generally connected to the vehicle at a hinge side of the door 10, and branches off on a route from a front side to a back side of the door 10 to be connected to various electrical components 18. The first wiring member housing groove 41 can be used to hold the first electrical wiring 51 connected to the electrical component 18 incorporated into the back side of the door 10, for example, a door lock-unlock motor.

A plurality of (two herein) second wiring member housing grooves 42 are formed. The second wiring member housing groove 42 is formed from the front part of the door resin component 30 toward an inner side of the wiring member housing groove 41 along the front-back direction of the vehicle. More specifically, the second wiring member housing groove 42 is formed in a position on an upper side of the first wiring member housing groove 41 from the middle portion of the front edge portion of the main plate 32 in the up-down direction to a middle portion of the inclined surface 37 in an extension direction via one main surface on the front side of the main plate 32. When the door resin component 30 is viewed from the side of the vehicle interior, the second wiring member housing groove 42 is linearly formed to extend along the front-back direction of the vehicle.

The plurality of second wiring member housing grooves 42 are formed to extend in a parallel state at intervals. Each second wiring member housing groove 42 is formed into a groove-like shape capable of housing a second electrical wiring 52 one by one in the manner similar to the first wiring member housing groove 41.

The second wiring member housing groove 42 can be used to hold the second electrical wiring 52 connected to the electrical component 18 incorporated into the upper side in the storage space forming part 34.

A plurality of (two herein) third wiring member housing grooves 43 are formed. The third wiring member housing groove 43 is formed from the front part of the door resin component 30 toward an inner side of the wiring member housing groove 41 along the front-back direction of the vehicle. More specifically, the third wiring member housing groove 43 is formed in a position on a lower side of the first wiring member housing groove 41 from the middle portion of the front edge portion of the main plate 32 in the up-down direction to the middle portion of the inclined surface 37 in the extension direction via one main surface on the front side of the main plate 32. The third wiring member housing groove 43 is formed longer than the second wiring member housing groove 42. When the door resin component 30 is viewed from the side of the vehicle interior, the third wiring member housing groove 43 is linearly formed to extend along the front-back direction of the vehicle.

The plurality of third wiring member housing grooves 43 are formed to extend in a parallel state at intervals. Each third wiring member housing groove 43 is formed into a groove-like shape capable of housing a third electrical wiring 53 one by one in the manner similar to the first wiring member housing groove 41.

The third wiring member housing groove 43 can be used to hold the third electrical wiring 53 connected to the electrical component 18 incorporated into the lower side in the storage space forming part 34.

The plurality of first wiring member housing grooves 41, the plurality of second wiring member housing grooves 42, and the plurality of third wiring member housing grooves 43 are formed in parallel at regular intervals on a part of the door resin component 30 near a hinge part, that is to say, on one main surface of the main plate 32 located closer to the front side in relation to the storage space forming part 34. The second wiring member housing groove 42 is eliminated, then the third wiring member housing groove 43 is eliminated, and finally, only the first wiring member housing groove 41 extends toward the back side from the front part toward the back part of the door resin component 30.

The wiring member 50 is an electrical wiring provided in the door 10 and connected to the electrical component 18 provided in the door 10. Herein, the wiring member 50 includes a plurality of electrical wiring 51, 52, and 53. An electrical wiring having a metal core wire with a covering around the core wire can be used as the electrical wirings 51, 52, and 53. The core wire may be a single core wiring or a stranded wiring.

Herein, the plurality of electrical wirings 51, 52, and 53 include a first electrical wiring 51, a second electrical wiring 52, and a third electrical wiring 53. The plurality of (three herein) first electrical wirings 51 are provided, the plurality of (two herein) second electrical wirings 52 are also provided, and the plurality of (two herein) third electrical wirings are also provided.

The first electrical wiring 51, the second electrical wiring 52, and the third electrical wiring 53 are collected in a parallel state on each one end side. It is assumed that one end portions of the first electrical wiring 51, the second electrical wiring 52, and the third electrical wiring 53 extend outside the door 10 from a hinge side thereof in a bundle, led to an inner side of a vehicle body, and connected to the other connector in the vehicle body via a common connector, for example. The first electrical wiring 51 extends longer than the second electrical wiring 52 and the third electrical wiring 53, and the second electrical wiring 52 and the third electrical wiring 53 branch off in a middle portion of the first electrical wiring 51 in an extension direction. A connector 56 is attached to the other end portions of the first electrical wiring 51, the second electrical wiring 52, and the third electrical wiring 53, and the first electrical wiring 51, the second electrical wiring 52, and the third electrical wiring 53 are connected to the electrical component 18 via the connector 56.

The plurality of first electrical wirings 51, second electrical wirings 52, and third electrical wiring 53 are divided and held in the plurality of first wiring member housing grooves 41, second wiring member housing grooves 42, and third wiring member housing grooves 43. Herein, the plurality of first wiring member housing grooves 41, second wiring member housing grooves 42, and third wiring member housing grooves 43 are formed in number and a parallel state corresponding to the plurality of first electrical wirings 51, second electrical wirings 52, and third electrical wirings 53. The plurality of first electrical wirings 51, second electrical wirings 52, and third electrical wiring 53 are individually held in the plurality of first wiring member housing grooves 41, second wiring member housing grooves 42, and third wiring member housing grooves 43.

More specifically, each of the plurality of first electrical wirings 51 are housed and held one by one in each of the plurality of first wiring member housing grooves 41. Accordingly, the plurality of first electrical wirings 51 are held along a certain route from the middle portion of the front edge portion of the main plate 32 in the up-down direction to the middle portion of the back edge portion of the main plate 32 in the up-down direction via one main surface on the front side of the main plate 32, the inclined surface 37, the inner surface 35 of the bottom of the storage space forming part 34, the inclined surface 39, and the other main surface on the back side of the main plate 32 along the plurality of first wiring member housing grooves 41. The plurality of first electrical wirings 51 extend from a back end portion of the door resin component 30 to be connected to the electrical component 18.

Each of the plurality of second electrical wirings 52 are housed and held one by one in each of the plurality of second wiring member housing grooves 42. Accordingly, the plurality of second electrical wirings 52 are held along a certain route from the middle portion of the front edge portion of the main plate 32 in the up-down direction to a midway portion of the inclined surface 37 via one main surface on the front side of the main plate 32 along the plurality of second wiring member housing grooves 42 on an upper side of the first electrical wiring 51.

Each of the plurality of third electrical wirings 53 are housed and held one by one in each of the plurality of third wiring member housing grooves 43. Accordingly, the plurality of third electrical wirings 53 are held along a certain route from the middle portion of the front edge portion of the main plate 32 in the up-down direction to the midway portion of the inclined surface 37 via one main surface on the front side of the main plate 32 along the plurality of third wiring member housing grooves 43 on a lower side of the first electrical wiring 51.

The plurality of second electrical wirings 52 and the plurality of third electrical wirings 53 go out of the second wiring member housing groove 42 and the third wiring member housing groove 43 in the midway portion of the inclined surface 37, are led to an inner side of the storage space forming part 34, and are connected to the electrical component 18 in the storage space forming part 34.

In the present embodiment, the plurality of first electrical wirings 51, second electrical wirings 52, and third electrical wirings 53 are individually housed in the first wiring member housing groove 41, the second wiring member housing groove 42, and the third wiring member housing groove 43, however, all of the plurality of electrical wirings may be housed and held in the common wiring member housing groove. It is also applicable that the plurality of electrical wirings are divided into a plurality of groups, the wiring member housing grooves in number corresponding to the plurality of groups are formed, and the plurality of electrical wirings are housed and held in the plurality of wiring member housing grooves for each of the plurality of groups.

Formed in an opening part of each of the first wiring member housing groove 41, the second wiring member housing groove 42, and a third wiring member housing groove 43 located on a side opposite to the bottom thereof is a hot-melt crush part 48 preventing the first electrical wiring 51, the second electrical wiring 52, and the third electrical wiring 53 in the first wiring member housing groove 41, the second wiring member housing groove 42, and the third wiring member housing groove 43 from coming out thereof (refer to FIG. 1 and FIG. 3).

Herein, the hot-melt crush part 48 is formed in areas in the first wiring member housing groove 41, the second wiring member housing groove 42, and the third wiring member housing groove 43 passing through the front side of the main plate 32 and the inclined surface 37. The hot-melt crush part 48 is formed in areas in the first wiring member housing groove 41 passing through the bottom of the storage space forming part 34, the inclined surface 39, and the back side of the main plate 32.

The hot-melt crush part 48 described above is formed of a protruding part. The protruding part is located on a peripheral edge portion of the opening part of each of the first wiring member housing groove 41, the second wiring member housing groove 42, and the third wiring member housing groove 43 on the side opposite to the bottom thereof to protrude to the side opposite to the bottom, and melted and crushed by heat to narrow or close the opening part.

The hot-melt crush part 48 described above narrows or closes the opening of each of the first wiring member housing groove 41, the second wiring member housing groove 42, and the third wiring member housing groove 43, but is not welded to the first electrical wiring 51, the second electrical wiring 52, and the third electrical wiring 53 housed therein. Accordingly, the first electrical wiring 51, the second electrical wiring 52, and the third electrical wiring 53 are held in the first wiring member housing groove 41, the second wiring member housing groove 42, and the third wiring member housing groove 43 to be movable along the extension direction thereof. Accordingly, even when a difference of a stretch amount occurs between the first electrical wiring 51, the second electrical wiring 52, and the third electrical wiring 53 and the door resin component 30 due to a difference in coefficient of thermal expansion, improper tensile force, for example, hardly acts on the first electrical wiring 51, the second electrical wiring 52, and the third electrical wiring 53.

However, the hot-melt crush part 48 may be welded to the first electrical wiring 51, the second electrical wiring 52, and the third electrical wiring 53.

Described is a procedure of attaching the first electrical wiring 51, the second electrical wiring 52, and the third electrical wiring 53 described above to the door resin component 30.

In a state before the first electrical wiring 51, the second electrical wiring 52, and the third electrical wiring 53 described above are attached to door resin component 30, a protruding part 49 is formed in a part of the door resin component 30 where the hot-melt crush part 48 is formed (refer to FIG. 4 and FIG. 5). The protruding part 49 is formed on both side portions of an opening in a part of each of the first wiring member housing groove 41, the second wiring member housing groove 42, and the third wiring member housing groove 43 where the hot-melt crush part 48 is formed. The protruding part 49 protrudes in a direction protruding from the main surface of the door resin component 30.

The first electrical wiring 51, the second electrical wiring, and the third electrical wiring are housed in the first wiring member housing groove 41, the second wiring member housing groove 42, and the third wiring member housing groove 43, respectively.

Figure 6:
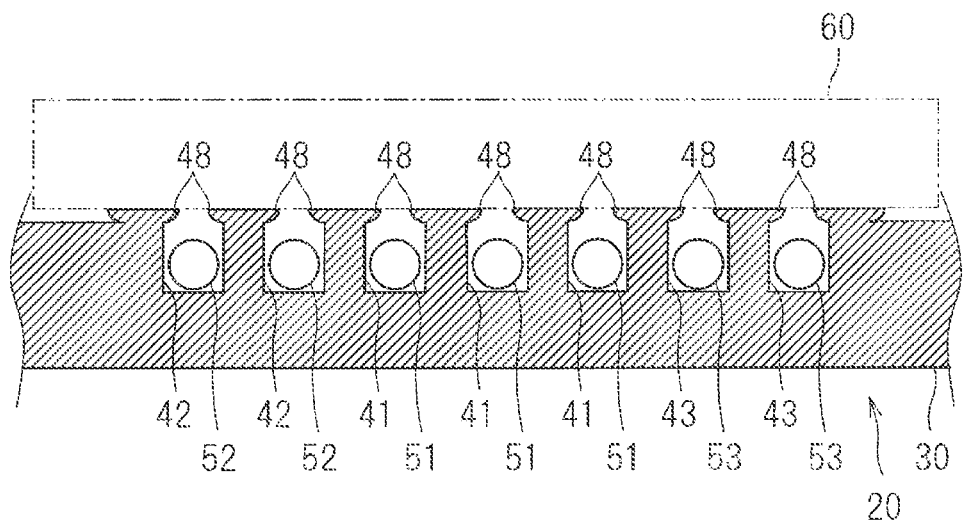
FIG. 6 An explanation drawing illustrating a process of forming a hot-melt crush part.

In this state, a hot-melt head 60 heated to a temperature at which the protruding part 49 of the door resin component 30 can be softened is pressed to the protruding part 49 (refer to FIG. 5 and FIG. 6). Then, the protruding part 49 is softened by the hot-melt head 60, and is crushed. The protruding part 49 softened and crushed is pressed and expanded to an upper side of the opening of each of the first wiring member housing groove 41, the second wiring member housing groove 42, and the third wiring member housing groove 43. Accordingly, the opening of each of the first wiring member housing groove 41, the second wiring member housing groove 42, and the third wiring member housing groove 43 is narrowed or closed. The hot-melt head 60 is a device having a tip surface which can have contact with the plurality of protruding parts 49 and heated by a heating part such as a heater.

Accordingly, the first electrical wiring 51, the second electrical wiring 52, and the third electrical wiring 53 are housed and held in the first wiring member housing groove 41, the second wiring member housing groove 42, and the third wiring member housing groove 43.

When the protruding part 49 is excessively crushed, there is a possibility that the crushed part enters an inner side of each of the first wiring member housing groove 41, the second wiring member housing groove 42, and the third wiring member housing groove 43, and is welded to the first electrical wiring 51, the second electrical wiring 52, and the third electrical wiring 53. Thus, it is preferable to press the hot-melt head 60 to the protruding part 49 to the extent that the crushed protruding part 49 does not excessively enter the inner side of each of the first wiring member housing groove 41, the second wiring member housing groove 42, and the third wiring member housing groove 43.

Figure 7:
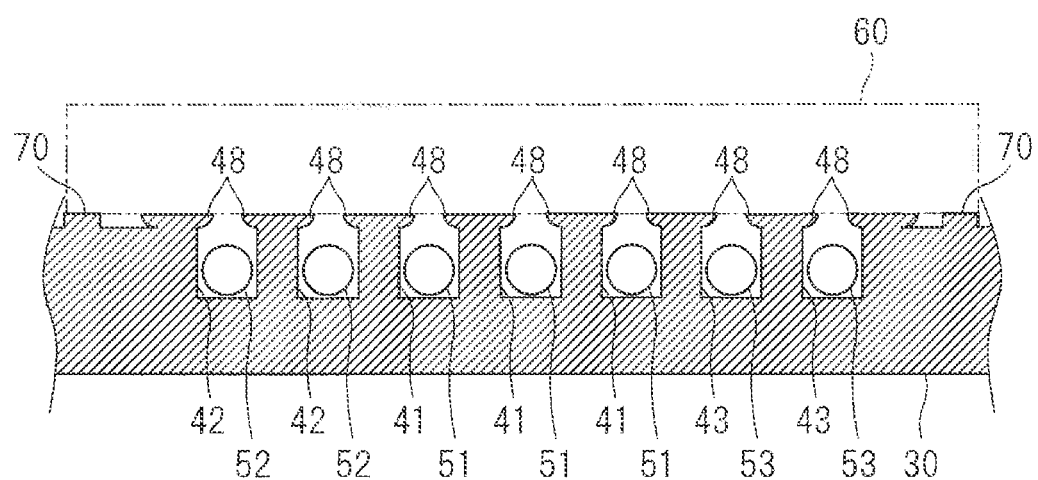
FIG. 7 An explanation drawing illustrating an example of forming a height adjustment protrusion part.

A degree of pressing the hot-melt head 60 can be adjusted by controlling a distance from the tip surface of the hot-melt head 60 to the main surface of the door resin component 30. In order to regulate the pressing to have a constant level, as illustrated in FIG. 7, a height adjustment protrusion 70 is preferably formed on both side portions of the first wiring member housing groove 41, the second wiring member housing groove 42, and the third wiring member housing groove 43 on the main surface of the door resin component 30. The height adjustment protrusion 70 is provided on a position facing a part of the hot-melt head 60 which is not heated sufficiently to soften the height adjustment protrusion 70, for example, a position facing a lateral portion of the hot-melt head 60. A protrusion dimension of the height adjustment protrusion 70 is set to a size so that a tip surface of the hot-melt head 60 is regulated to be located in a position a predetermined distance away from the main surface of the door resin component 30. The predetermined distance is set so that the protruding part 49 hot-melted by the hot-melt head 60 can narrow or close the opening of each of the first wiring member housing groove 41, the second wiring member housing groove 42, and the third wiring member housing groove 43 but can hardly enter the first wiring member housing groove 41, the second wiring member housing groove 42, and the third wiring member housing groove 43, and can be experimentally and empirically determined.

Then, the hot-melt head 60 is pressed to the protruding part 49 until the hot-melt head 60 has contact with the height adjustment protrusion 70 to crush the protruding part 49, thus the protruding part 49 is hot-melted at substantially the constant level. Accordingly, the first electrical wiring 51, the second electrical wiring 52, and the third electrical wiring 53 can be held in the first wiring member housing groove 41, the second wiring member housing groove 42, and the third wiring member housing groove 43 by the protruding part 49 more reliably, and the welding of the protruding part 49 to the first electrical wiring 51, the second electrical wiring 52, and the third electrical wiring 53 can be suppressed.

It may be difficult to simultaneously locate the first electrical wiring 51, the second electrical wiring 52, and the third electrical wiring 53 in the first wiring member housing groove 41, the second wiring member housing groove 42, and the third wiring member housing groove 43 by reason that the other end portions of the first electrical wiring 51, the second electrical wiring 52, and the third electrical wiring 53 are led to different destinations, for example. In such a case, the first electrical wiring 51, the second electrical wiring 52, and the third electrical wiring 53 may be divided into a plurality of groups to perform an operation of locating the electrical wirings for each group. For example, the first electrical wiring 51, the second electrical wiring 52, and the third electrical wiring 53 are sequentially disposed in the first wiring member housing groove 41, the second wiring member housing groove 42, and the third wiring member housing groove 43 at a different operation timing. In this case, the operation of forming the hot-melt crush part 48 is preferably performed on each of the first electrical wiring 51, the second electrical wiring 52, and the third electrical wiring 53 separately. Furthermore, in this case, the hot-melt crush part 48 may be formed in a position shifting in the extension direction for each of the first wiring member housing groove 41, the second wiring member housing groove 42, and the third wiring member housing groove 43.

According to the wiring member integrated door resin component 20 having the above configuration, the wiring member 50 (the first electrical wiring 51, the second electrical wiring 52, and the third electrical wiring 53) is held to the door resin component 30 in the state of being housed in the wiring member housing grooves 41, 42, and 43. Accordingly, the hole for inserting the clip for holding the wiring member 50 needs not be formed in the part where the wiring member 50 is held by the wiring member housing grooves 41, 42, and 43. Accordingly, the number of holes for fixing the wiring member 50 can be reduced as much as possible in the configuration of holding the wiring member 50 in the door 10.

The door resin component 30 which is an example of the built-in component is the resin component, thus downsizing can be achieved.

The wiring member 50 may be held by the clip in a part other than the part where the wiring member 50 is held by the wiring member housing grooves 41, 42, and 43. Even in this case, the number of holes for holding the clip can be reduced as much as possible.

The wiring member housing grooves 41, 42, and 43 are formed in the door resin component 30 incorporated to cover the opening 15 of the metal inner panel 14, and the wiring member 50 is housed and held in the wiring member housing grooves 41, 42, and 43, thus a thickness of the door 10 can be reduced, and furthermore, a space of vehicle interior can be increased.

Formed in the opening part of each of the wiring member housing grooves 41, 42, and 43 located on the side opposite to the bottom thereof is the hot-melt crush part 48 preventing the wiring member 50 from coming out of the wiring member housing grooves 41, 42, and 43, thus the wiring member 50 can be held in the wiring member housing grooves 41, 42, and 43 more reliably without welding the door resin component 30 and the wiring member 50.

That is to say, a configuration of welding the wiring member to the door resin component, for example, is also considered as the configuration of holding the wiring member in the door resin component, however, in this case, there is a possibility that adhesion properties is reduced if a combination of the covering material of the wiring member and the material of the door resin component does not have favorable adhesion properties. There is also a need to take measures not to excessively increase a thermal influence on the covering material. In the present embodiment, the wiring member 50 is not welded by the hot-melt crush part 48, but the hot-melt crush part 48 narrows or covers the opening of each of the wiring member housing grooves 41, 42, and 43 to hold the wiring member 50 in the wiring member housing grooves 41, 42, and 43. Thus, the combination of the covering material of the wiring member 50 and the material of the door resin component 30 or the thermal influence on the covering material, for example, needs not be considered.

The wiring member 50 can be moved in the wiring member housing grooves 41, 42, and 43 along the longitudinal direction thereof, thus even when a difference in thermal shrinkage and expansion occurs between the wiring member 50 and the door resin component 30, for example, the wiring member 50 is moved in the wiring member housing grooves 41, 42, and 43, thus the difference in thermal shrinkage and expansion can be absorbed and improper tensile force, for example, hardly acts on the wiring member 50.

The first electrical wiring 51, the second electrical wiring 52, and the third electrical wiring 53 which are the wiring member 50 are divided in the first wiring member housing groove 41, the second wiring member housing groove 42, and the third wiring member housing groove 43 formed in the parallel state, and held in the first wiring member housing groove 41, the second wiring member housing groove 42, and the third wiring member housing groove 43, thus the first electrical wiring 51, the second electrical wiring 52, and the third electrical wiring 53 can be held as flatly as possible.

Furthermore, the plurality of first electrical wirings 51, second electrical wirings 52, and third electrical wirings 53 are individually held in the first wiring member housing groove 41, the second wiring member housing groove 42, and the third wiring member housing groove 43, thus the first electrical wiring 51, the second electrical wiring 52, and the third electrical wiring 53 can be held more flatly.

Modification Example

Various modification examples are described based on a premise of the embodiment described above.

Figure 8:
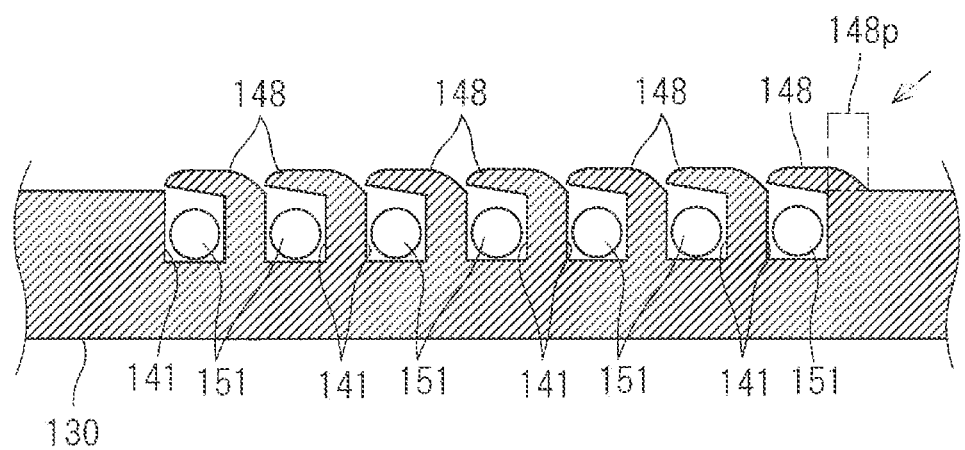
FIG. 8 A schematic cross-sectional view illustrating a wiring member integrated door resin component according to a first modification example.

Described in the above embodiment is an example that protruding part on the both sides of the peripheral edge portion of the opening part of each of the wiring member housing grooves 41, 42, and 43 on the side opposite to the bottom is melted by heat and crushed to narrow or close the opening. However, as is a case in a first modification example illustrated in FIG. 8, it is also applicable that a protruding part 148p located on one side of the peripheral edge portion of the opening part of each of the wiring member housing grooves 141 on the side opposite to a bottom thereof is melted by heat and crushed to be folded toward the opening of each of the wiring member housing grooves 141 to form the hot-melt crush part 148 in a state where an electrical wiring 151 is housed in each of the wiring member housing grooves 141 formed in a door resin component 130 corresponding to the door resin component 30, thus the opening of the wiring member housing groove 141 is narrowed or closed. A resin of the protruding part 148p, for example, is preferably melted and crushed when the resin is softened to some degree. That is to say, it is preferable that the resin is softened by heat to some degree, and the original shape is deformed to close at least a part of the opening.

Figure 9:
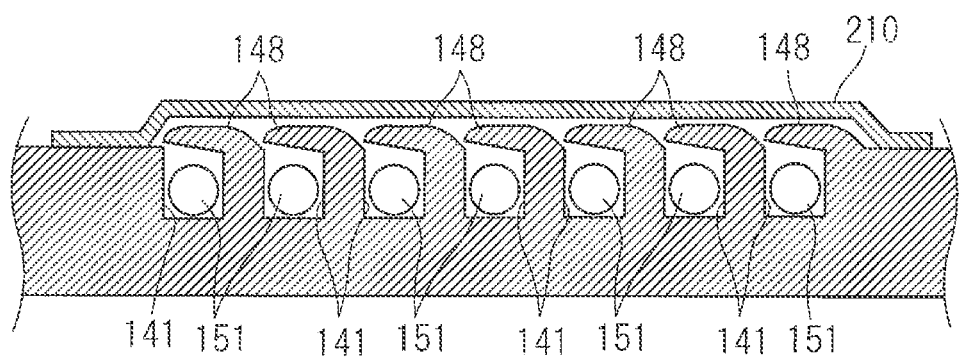
FIG. 9 A schematic cross-sectional view illustrating a wiring member integrated door resin component according to a second modification example.

As is a case in a second modification example illustrated in FIG. 9, a cover member 210 covering a wiring member (the electrical wiring 151) from a side opposite to the door resin component 130 may be provided in the first modification example. The cover member 210 is a thin member such as a resin film, a resin sheet, and a non-woven sheet. When the cover member 210 has a function as a silencer such as a foam resin (urethane foam) and a non-woven sheet, the cover member 210 may also be considered as a soundproof member.

The cover member 210 is attached to a door resin component 130 by a member referred to as a clamp or clip, a double-sided tape, an adhesive tape, an adhesive agent, thermal welding, and ultrasonic welding, for example. According to this example, the wiring member (the electrical wiring 151) are covered by the cover member 210, thus force of making the wiring member (the electrical wiring 151) fall away from the door resin component 130 hardly acts on the wiring member (the electrical wiring 151), thus the wiring member (the electrical wiring 151) hardly comes out of the door resin component 130.

Figure 10:
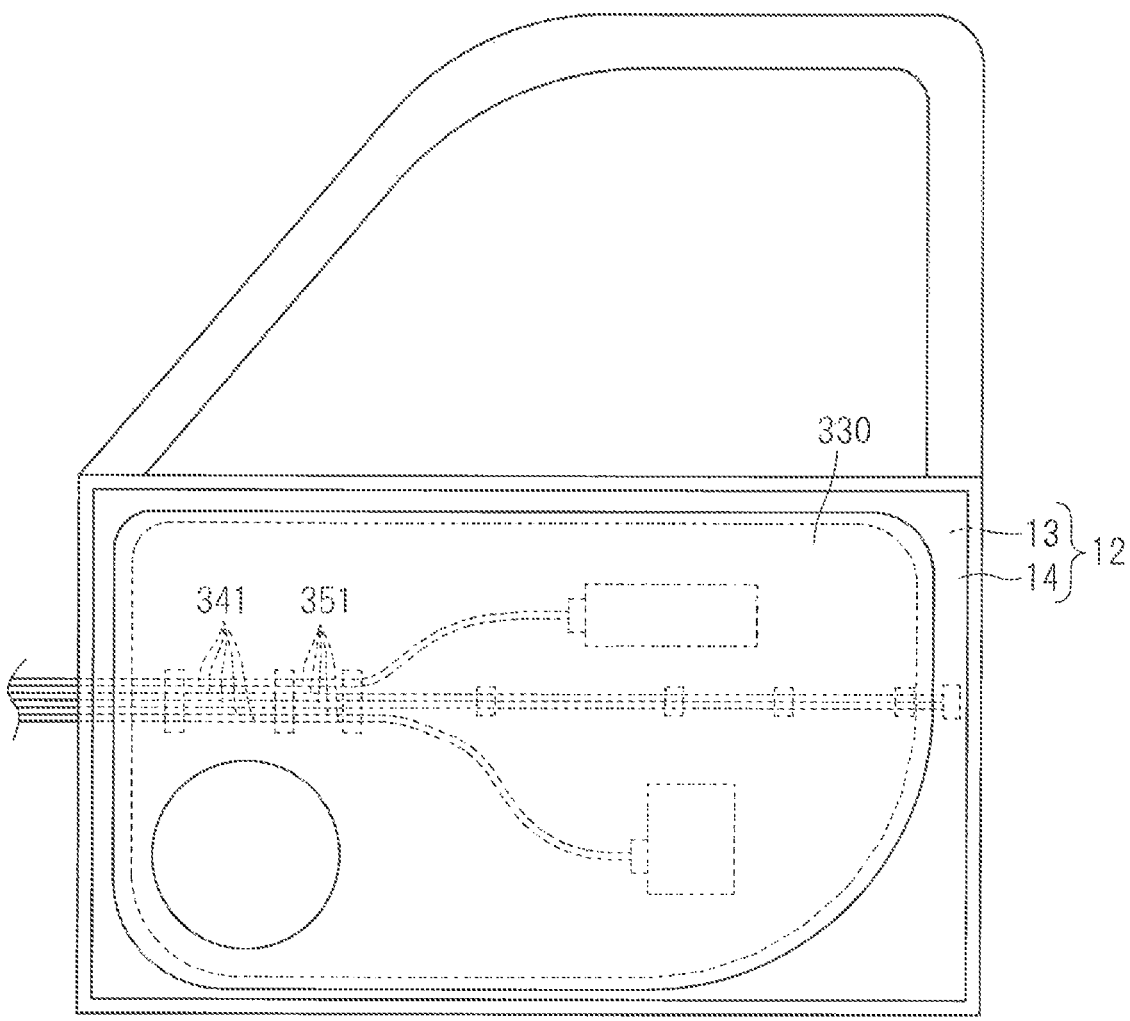
FIG. 10 A schematic side view illustrating a wiring member integrated door resin component according to a third modification example.

In the example in the embodiment described above, the wiring member housing grooves 41, 42, and 43 are provided in the part of the door resin component 30 facing outer side of the box-like member, that is to say, the part facing the inner side in the automobile. However, as is a case in a third modification example illustrated in FIG. 10, it is also applicable that a wiring member housing groove 341 is formed in a part of a door resin component 330 corresponding to the door resin component 30 facing the inner side of the box-like member, that is to say, a part facing the outer side in the automobile to house an electrical wiring 351 in the wiring member housing groove 341. In this case, the electrical wiring 351 is held in an inner side of the metal inner panel 14 and the metal outer panel 13 having the box-like shape. In this modification example, the storage space forming part 34 is not formed in the door resin component 30, but the door resin component 330 has a flat shape in whole. Obviously, a convex-concave portion for locating an electrical component, for example, may be formed in the door resin component 330. When the electrical component is provided in the inner side of the door, such a layout may be applied.

In any case, the wiring member (the electrical wiring 351) can be held in the part of the door resin component 330 which is the example of the built-in component facing the inner side or the outer side of the box-like member.

Figure 11:
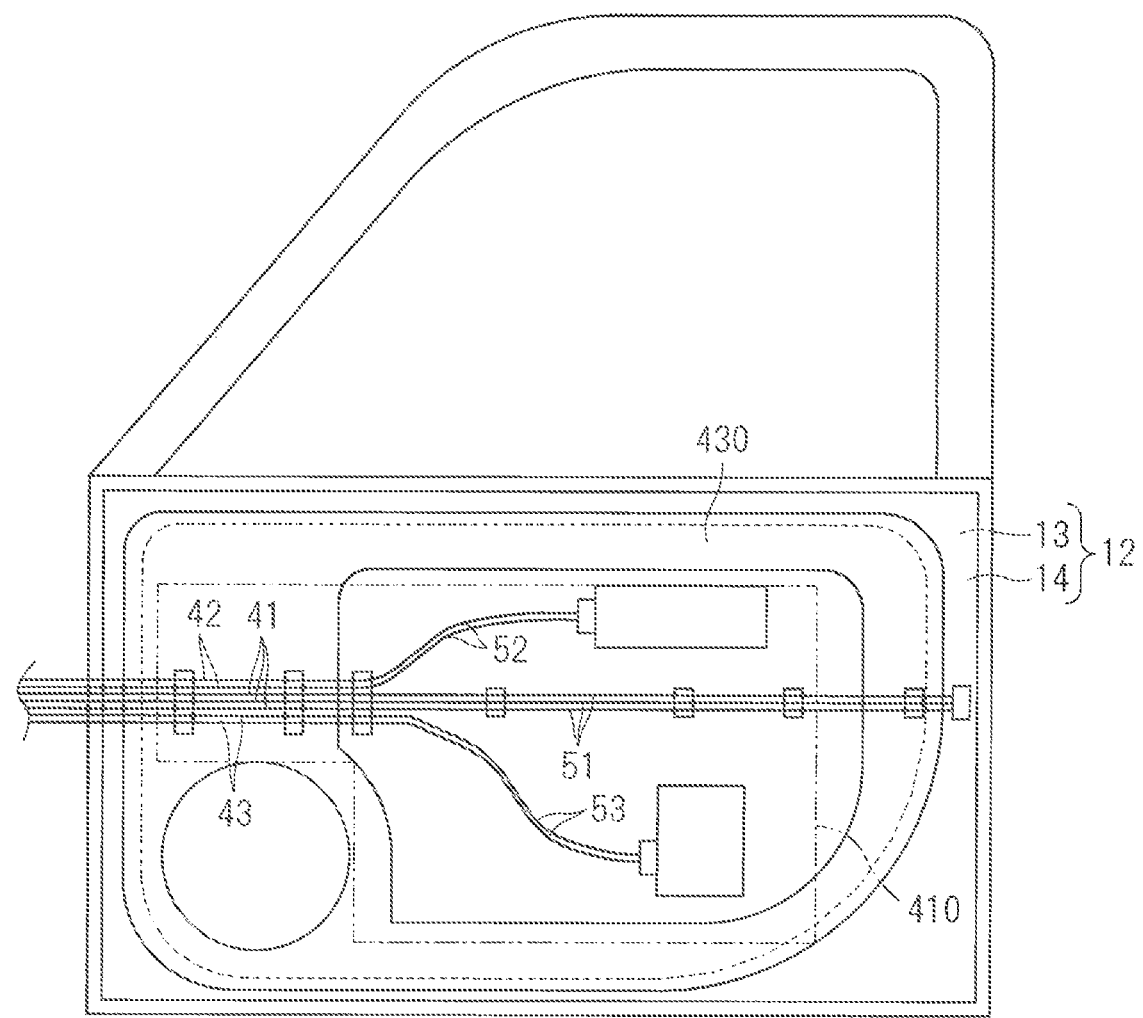
FIG. 11 A schematic side view illustrating a wiring member integrated door resin component according to a fourth modification example.
Figure 12:
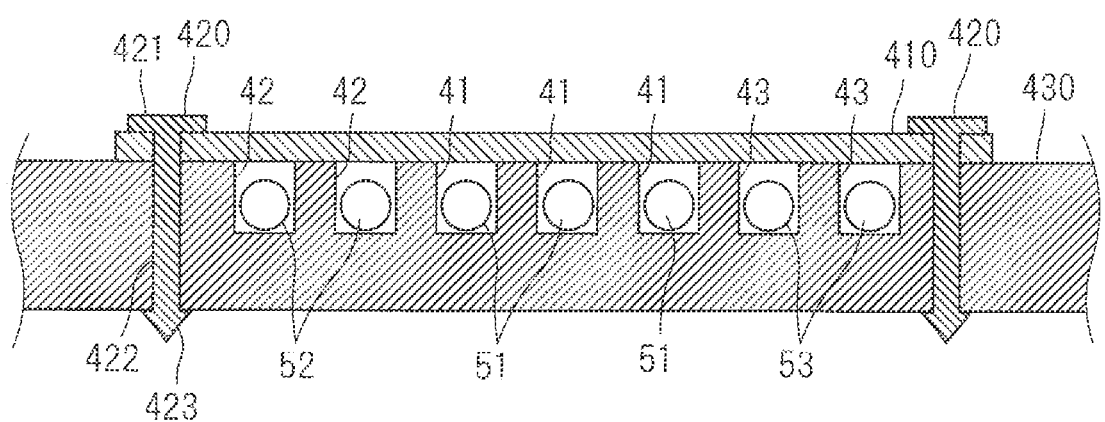
FIG. 12 A schematic cross-sectional view illustrating the wiring member integrated door resin component according to the fourth modification example.

As is a case in a fourth modification example illustrated in FIG. 11 and FIG. 12, a soundproof member 410 may overlap with a door resin component 430, which corresponds to the door resin component 30 in the embodiment described above, on a side where the wiring member housing grooves 41, 42, and 43 are formed. In the description herein, the door resin component 430 has a flat shape, however, a convex-concave portion for housing an electrical component, for example, may be formed. The soundproof member 410 is a member for reducing sound. The soundproof member may be made up of an acoustic material, or may also be made up of a sound insulating material. The acoustic material has a space when seeing a cross section in a thickness direction. The acoustic material absorbs sound energy which has entered, for example, thereby reducing a reflection of sound as much as possible. A material having a larger number of small spaces therein such as a foam resin (urethane foam) and a non-woven sheet, for example, can be used as the acoustic material. The sound insulating material does not have a space when seeing a cross section in a thickness direction. The sound insulating material absorbs or reflects the sound energy, thereby cutting sound as much as possible, for example. Any of the acoustic material and the sound insulating material may be used as the soundproof member. The soundproof member may double as the function as the acoustic material and the function of the sound insulating material.

Herein, the soundproof member 410 is fixed to the door resin component 430 by a fixing component 420 referred to as a clamp or clip. The fixing component 420 includes a head part 421, a column part 422, and a retaining protrusion 423, and is formed of resin, for example. The column part 422 is formed into a rod-like shape. The plate-like head part 421 is formed in one end portion of the column part 422. The retaining protrusion 423 has a configuration of being gradually tapered toward a tip side and having a retaining part 423a, which can be locked to a hole formed in the door resin component 430 so as not to come out thereof, on a base end portion.

The head part 421 has direct contact with an outer surface of the soundproof member 410 in a state where the retaining protrusion 423 passes through the soundproof member 410 and the hole of the door resin component 430, and the retaining protrusion 423 is locked to a peripheral edge part of the hole of the door resin component 430 so as not to come out thereof. The soundproof member 410 is fixed to the door resin component 430 by the fixing component 420 in a plurality of positions, particularly, positions on both sides of the plurality of wiring member housing grooves 41, 42, and 43.

According to this modification example, the sound can be cut on the inner side and the outer side of the metal inner panel 14 and the metal outer panel 13 having the box-like shape by the soundproof member 410. Herein, the sound can be cut inside and outside the vehicle. Even when abnormal noise occurs due to a vibration of the electrical wirings 51, 52, and 53 in the wiring member housing grooves 41, 42, and 43, a leakage of the abnormal noise to the outer side can be suppressed. The wiring member (the electrical wirings 51, 52, and 53) is covered by the soundproof member 410, thus the wiring member (the electrical wirings 51, 52, and 53) hardly comes out of the door resin component 130. In this point, the soundproof member 410 is also considered a type of cover member. In this manner, measures for sound proofing and retaining of the wiring member (the electrical wirings 51, 52, and 53) can be taken by the soundproof member 410.

Figure 13:
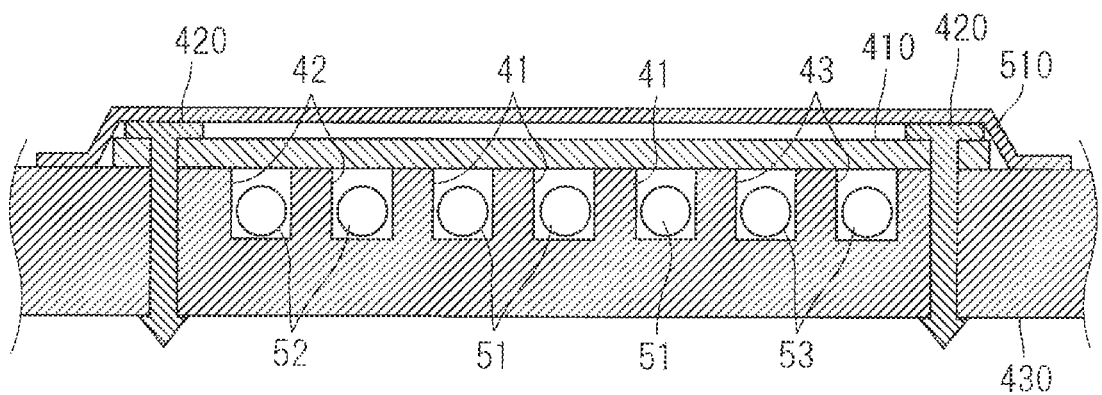
FIG. 13 A schematic cross-sectional view illustrating a wiring member integrated door resin component according to a fifth modification example.

As is a case in a fifth modification example illustrated in FIG. 13, a cover member 510 covering the wiring member (the electrical wirings 51, 52, and 53) from a side opposite to the door resin component 430 may be further provided in the fourth modification example. The cover member 510 has the configuration similar to the cover member 210 described above, and covers the wiring member (the electrical wirings 51, 52, and 53) and the soundproof member 410 from an outer side of the soundproof member 410. Accordingly, the wiring member (the electrical wirings 51, 52, and 53) further hardly comes out of the door resin component 430.

The cover member may be applied to the embodiment described above and the other modification example.

Figure 14:
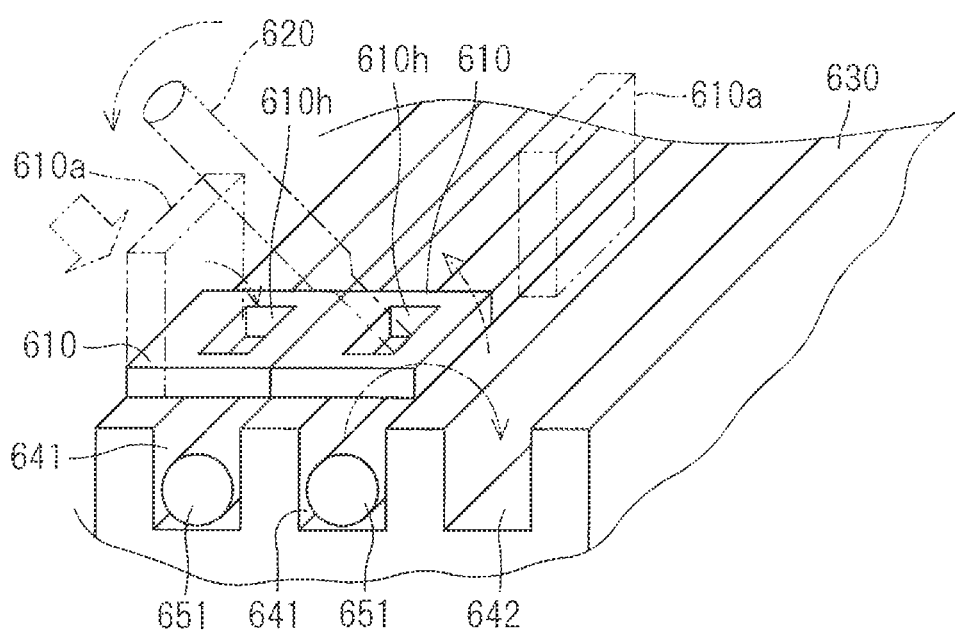
FIG. 14 A schematic perspective view illustrating a wiring member integrated door resin component according to a sixth modification example.

In a sixth modification example illustrated in FIG. 14, wiring member housing grooves 641 and 642 are formed in a door resin component 630 corresponding to the door resin component 30. An electrical wiring 651 is housed in the wiring member housing groove 641 (the two wiring member housing grooves 641 are illustrated in FIG. 14). A retainer part 610 preventing the electrical wiring 651, which is the wiring member in the wiring member housing groove 641, from coming out of the wiring member housing groove 641 is formed on an opening part of the wiring member housing groove 641 on a side opposite to a bottom thereof. That is to say, the retainer part 610 extends to close at least a part of an opening of the wiring member housing groove 641, and partially or wholly (partially herein) narrows or closes the opening of the wiring member housing groove 641 in a longitudinal direction thereof. The retainer part 610 may be a part formed by thermally melting and crushing a protruding piece 610a in the manner similar to the embodiment described above and the first modification example. The retainer part 610 may be a part formed together with the other part by molding, for example, at a time of originally manufacturing the door resin component 630. In the latter case, it is preferable that the retainer part 610 is elastically deformed to press the electrical wiring 651 in the wiring member housing groove 641. The former case is described herein.

A through hole 610h is formed in the retainer part 610. The through hole 610h is a hole passing through from an outer side of the retainer part 610 toward an inner side of the wiring member housing groove 641. Even in the case where the retainer part 610 is thermally melted and crushed, when the through hole is formed in the original protruding piece and the protruding piece is thermally melted and crushed by heat to such an extent that the through hole remains, the through hole 610h can be formed in the retainer part 610. Alternatively, it is also applicable to form a protruding part for forming the through hole 610h in a jig itself performing the hot-melt crush, thereby forming the through hole 610h at the same time as the hot-melt crush.

In an initial state where the electrical wiring 651 is held in the door resin component 630, the electrical wiring 651 is not held in the other wiring member housing groove 642. The other wiring member housing groove 642 is an auxiliary groove. When there is an inconvenience in the electrical wiring 651 housed in the wiring member housing groove 641, the electrical wiring 651 can be detached from the wiring member housing groove 641 by inserting a tool 620 such as a flat-blade screwdriver into the through hole 610h described above and bringing up the retainer part 610 to an upper side, using a principle of leverage, for example. At this time, the retainer part 610 may be broken. In such a case, the electrical wiring 651 can be held using the auxiliary wiring member housing groove 642 by housing the electrical wiring 651 in the auxiliary wiring member housing groove 642 and thermally melting and crushing a protruding part 610a. The auxiliary wiring member housing groove 642 may be used for specification change (a case where a specification is changed to add the electrical wiring).

Figure 15:
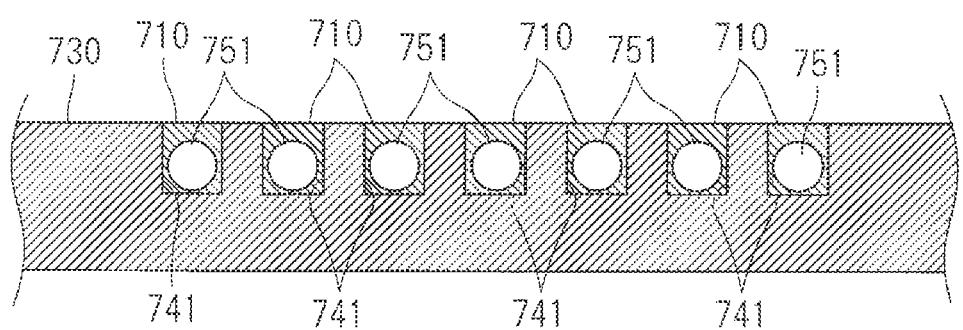
FIG. 15 A schematic cross-sectional view illustrating a wiring member integrated door resin component according to a seventh modification example.

In a seventh modification example illustrated in FIG. 15, the wiring member housing groove 741 is formed in a door resin component 730 corresponding to the door resin component 30. An electrical wiring 751 housed in the wiring member housing groove 741 is fixed in the wiring member housing groove 741 by a filling fixing part 710 instead of the formation of the hot-melt crush part. The filling fixing part 710 is formed by solidifying a fluent material filling the wiring member housing groove 741 housing the electrical wiring 751. Applicable as the fluent material is a material entering a fluidized state by heat and entering a solidified state by cooling such as a hot-melt adhesive agent, a two-liquid mixing adhesive agent, a light curing adhesive agent, thermoset adhesive agent, a moisture curing adhesive agent, for example.

According to this example, the filling fixing part 710 fixes the electrical wiring 751 in the wiring member housing groove 741 while filling the wiring member housing groove 741, thus the electrical wiring 751 can be firmly fixed in the wiring member housing groove 741. The electrical wiring 751 hardly vibrates in the wiring member housing groove 741, thus the occurrence of the abnormal noise can be suppressed.

Described in the above embodiment is the example that the wiring member housing grooves 41, 42, and 43 are formed in the door resin component 30 incorporated into the opening 15 of the metal inner panel 14, and the wiring member 50 is held therein. The wiring member may be incorporated into the other door resin component. For example, it is also applicable that a wiring member housing groove is formed on an inner side of a resin trim attached to a side of a vehicle interior of the metal panel 12, and a wiring member is housed and held in the wiring member housing groove. In this case, the metal panel 12 itself is the example of the box-like component with the box shape having the opening to which the resin trim can be attached.

In the above embodiment and each modification example, the example of holding the wiring member by the door resin component is described. However, the member holding the wiring member only needs to be a built-in component incorporated into the box-like member to partition an inner side and outer side of the box-like member. For example, a roof and a roof interior component provided in the roof constitute a box-like member forming a flat space therebetween. It is also applicable that the wiring member housing groove is formed in the roof interior component and the wiring member is held in the wiring member housing groove. A battery storage box is assumed as the box-like component, and the built-in component may be a cover incorporated into an opening of the battery storage box. In this case, for example, the wiring member may be held in a rear side (an inner side of the box) of the cover. Accordingly, there is a merit that the wiring member can be routed using a space between the rear side of the cover and an object (a battery) in the battery storage box.

In the above embodiment and each modification example, the example that the door resin component which is the example of the built-in component is made of resin is described. However, the built-in component may be a metal component, for example. For example, it is also applicable that the door resin component is a metal plate, and the wiring member housing groove is formed in the metal plate by a press molding or a cutting work, for example.

In the above embodiment, the case where the wiring member is the electrical wiring is described, however, the wiring member may be a band-like wiring member made up of a plurality of linear conductors covered in a parallel state, for example, a flexible flat cable.

Each configuration described in the embodiments and modification examples thereof can be appropriately combined as long as they are not contradictory. For example, the cover member 210 may be applied to the wiring member integrated door resin component 20 described in the embodiment and the other modification example.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS

10 door
14 metal inner panel
15 opening
20 wiring member integrated door resin component
30, 130, 330, 430, 630, 730 door resin component
41 first wiring member housing groove
42 second wiring member housing groove
43 third wiring member housing groove
48, 148 hot-melt crush part
49 protruding part
50 wiring member
51 first electrical wiring
52 second electrical wiring
53 third electrical wiring
141, 341, 641, 642, 741 wiring member housing groove
151, 351, 651, 751 electrical wiring
210, 510 cover member
410 soundproof member
420 fixing component
610 retainer part
610*h* through hole
710 filling fixing part

The invention claimed is:

1. A wiring member integrated built-in component, comprising:
   a built-in component having at least one wiring member housing groove in one main surface and incorporated into a box-like member to partition an inner side and outer side of the box-like member; and
   a wiring member held to the built-in component while at least a part of the wiring member in an extension direction is housed in the wiring member housing groove, wherein
   a part of the built-in component on a side opposite to the wiring member housing groove includes a part formed to have a flat surface, and
   the built-in component is a door component incorporated into a metal inner panel located on an inner side of a door to cover an opening of the metal inner panel.

2. The wiring member integrated built-in component according to claim 1, wherein
   the built-in component is a resin component.

3. The wiring member integrated built-in component according to claim 1, wherein
   the wiring member housing groove is formed in a part of the built-in component facing an inner side or outer side of the box-like member.

4. The wiring member integrated built-in component according to claim 1, further comprising
   a soundproof member overlapping with the built-in component on a side where the wiring member housing groove is formed.

5. The wiring member integrated built-in component according to claim 1, wherein
   the wiring member is held in the wiring member housing groove to be movable along an extension direction of the wiring member housing groove.

6. The wiring member integrated built-in component according to claim 1, wherein
   the wiring member includes a plurality of electrical wirings,
   the plurality of wiring member housing grooves are formed in a parallel state in the built-in component, and
   the plurality of electrical wirings are divided and held in the plurality of wiring member housing grooves.

7. The wiring member integrated built-in component according to claim 6, wherein
   the plurality of wiring member housing grooves are formed in a parallel state in number corresponding to a total number of the plurality of electrical wirings, and
   the plurality of electrical wirings are individually held in the plurality of wiring member housing grooves.

8. The wiring member integrated built-in component according to claim 1, further comprising
   a cover member covering the wiring member from a side opposite to the built-in component.

9. A wiring member integrated built-in component, comprising:
   a built-in component having at least one wiring member housing groove in one main surface and incorporated into a box-like member to partition an inner side and outer side of the box-like member; and a wiring member held to the built-in component while at least a part of the wiring member in an extension direction is housed in the wiring member housing groove, wherein the built-in component is a resin component, and a hot-melt crush part preventing the electrical wiring in the wiring member housing groove from coming out of the wiring member housing groove is formed in an opening part of the wiring member housing groove located on a side opposite to a bottom of the wiring member housing groove.

10. The wiring member integrated built-in component according to claim 9, wherein the wiring member housing groove is formed in a part of the built-in component facing an inner side or outer side of the box-like member.

11. The wiring member integrated built-in component according to claim 9, wherein the wiring member is held in the wiring member housing groove to be movable along an extension direction of the wiring member housing groove.

12. The wiring member integrated built-in component according to claim 9, wherein the wiring member includes a plurality of electrical wirings, the plurality of wiring member housing grooves are formed in a parallel state in the built-in component, and the plurality of electrical wirings are divided and held in the plurality of wiring member housing grooves.

13. The wiring member integrated built-in component according to claim 9, further comprising a cover member covering the wiring member from a side opposite to the built-in component.

14. A wiring member integrated built-in component, comprising:

a built-in component having at least one wiring member housing groove in one main surface and incorporated into a box-like member to partition an inner side and outer side of the box-like member; and a wiring member held to the built-in component while at least a part of the wiring member in an extension direction is housed in the wiring member housing groove, wherein a retainer part preventing the electrical wiring in the wiring member housing groove from coming out of the wiring member housing groove is formed on an opening part of the wiring member housing groove on a side opposite to a bottom of the wiring member housing groove, and a through hole is formed in the retainer part.

15. The wiring member integrated built-in component according to claim 14, wherein the wiring member is held in the wiring member housing groove to be movable along an extension direction of the wiring member housing groove.

16. The wiring member integrated built-in component according to claim 14, wherein the wiring member includes a plurality of electrical wirings, the plurality of wiring member housing grooves are formed in a parallel state in the built-in component, and the plurality of electrical wirings are divided and held in the plurality of wiring member housing grooves.

17. The wiring member integrated built-in component according to claim 14, further comprising a cover member covering the wiring member from a side opposite to the built-in component.

18. A wiring member integrated built-in component comprising:

a built-in component having at least one wiring member housing groove in one main surface and incorporated into a box-like member to partition an inner side and outer side of the box-like member; and a wiring member held to the built-in component while at least a part of the wiring member in an extension direction is housed in the wiring member housing groove, wherein the wiring member integrated built-in component further comprises a filling fixing part filling the wiring member housing groove to fix the wiring member in the wiring member housing groove.

19. The wiring member integrated built-in component according to claim 18, wherein the wiring member includes a plurality of electrical wirings, the plurality of wiring member housing grooves are formed in a parallel state in the built-in component, and the plurality of electrical wirings are divided and held in the plurality of wiring member housing grooves.

20. The wiring member integrated built-in component according to claim 18, further comprising a cover member covering the wiring member from a side opposite to the built-in component.

* * * * *